UNITED STATES PATENT OFFICE 2,445,377

METHOD OF TREATING ORES AND CONCENTRATE PRODUCED THEREBY

Lewis B. Wyckoff, Lewiston, N. Y., assignor to Electro Metallurgical Company, a corporation of West Virginia No Drawing. Application May 1, 1945, Serial No. 591,415

4 Claims. (Cl. 75—30)

The invention relates to the treatment of materials containing oxydic compounds of titanium and to titanium-rich concentrates produced by such treatment. It has for its principal object the production, from materials containing substantial proportions of iron oxides and titanium oxides, of concentrates rich in titanium oxides and substantially free of iron.

The richest ore of titanium, rutile, consists substantially entirely of titanium dioxide ($TiO_2$). This ore is becoming so scarce and expensive that a satisfactory substitute is sought. There exist large deposits of other titanium ores, for example ilmenite and titaniferous iron ores, but such ores contain substantial proportions of oxydic iron and, for technical and economic reasons, are not well suited to the preparation of titanium or its alloys and compounds. Efforts have accordingly been made to remove substantially all of the iron from these materials and thereby to produce a titanium concentrate suitable for use as a substitute for rutile.

In my copending application Serial No. 448,607, filed June 26, 1942, now Patent 2,375,268, issued May 8, 1945, there is described a process for treating materials containing oxydic compounds of both titanium and iron which comprises smelting a furnace charge containing such a material, a carbonaceous reducing agent to reduce the iron oxides and alumina and lime (CaO) in quantities properly proportioned to the titanium oxide content of the material to produce a fluid slag rich in titanium. The slag, recovered separately from the iron, is a very satisfactory titanium concentrate containing at least about 65% titanium oxide calculated as $TiO_2$.

It has now been discovered that a mixture of calcium oxide, aluminum oxide and magnesium oxide may be used to flux a furnace charge containing titanium oxide, iron oxide and carbon, producing a fluid, workable slag at temperatures below 1650° C., the slag being rich in titanium oxide and substantially free of iron.

The invention which is based on this discovery comprises a method of treating materials containing oxydic compounds of both titanium and iron, which method includes the steps of preparing a furnace charge containing the material to be treated, a carbonaceous reducing agent, such as coal, coke, or charcoal for example, in a quantity sufficient to reduce substantially all of the iron oxide in the material, and calcium oxide and a mixture of aluminum oxide and magnesium oxide in quantity sufficient to flux the charge and to produce, when the charge is smelted, a titanium-rich slag which is fluid at a temperature below about 1650° C. and which contains, in addition to titanium oxide, effective proportions of calcium oxide, alumium oxide and magnesium oxide; and smelting such charge in a furnace to produce molten iron and a slag of such composition which may be separately recovered. The invention also includes the titanium-rich slag or concentrate produced by this treatment. Suitable slags contain for example about 8% to 20% calcium oxide and 10% to 20% in the aggregate of aluminum oxide and magnesium oxide, the remainder, except for incidental impurities, being titanium oxide.

In the practice of the invention the quantity of fluxing materials to be used is based on the quantity of titanium oxide and fluxing agents in the material to be treated. For every 100 parts of titanium oxide in the furnace charge there should be present about 9 to 32 parts of calcium oxide and 12 to 33 parts in the aggregate of aluminum oxide and magnesium oxide. The aluminum oxide and magnesium oxide should be present in about equal proportions for best results. For the treatment of materials containing substantial quantities of magnesium oxide or aluminum oxide or both as impurities, for example certain ilmenite ores, the quantities of magnesium oxide and aluminum oxide in the material itself should be taken into consideration, and the amounts of magnesium oxide and aluminum oxide to be added to the charge correspondingly reduced. To form the furnace charge, the ore material to be treated and the fluxing materials are preferably crushed and thoroughly mixed with sufficient carbonaceous material to reduce all of the iron oxide in the ore material. The charge is then ready for smelting.

When a furnace charge prepared as just described is smelted in a furnace, iron oxides are reduced to elemental iron and a fluid slag rich in titanium oxide is produced at temperatures below 1650° C. Molten globules of elemental iron coalesce and fall through the slag by gravity thus being separated from the slag. The molten iron and slag are then separately recovered. The solidified slag forms an excellent raw material for the preparation of titanium alloys and compounds.

The titanium-rich slag or concentrate produced by the method of the invention contains about 8% to 20% calcium oxide, 10% to 20% in the aggregate of aluminum oxide and magnesium oxide, the latter two oxides each being present in a proportion of 5% to 15% of the slag and preferably being present in substantially equal proportions, the remainder, except for incidental impurities, being titanium oxide, the minimum titanium oxide content being about 62%, calculated as $TiO_2$. Slags within these composition limits are well suited to use in the production of titanium alloys and compounds by well known methods. Being substantially free of iron and rich in titanium oxide, they afford an effective substitute for rutile.

Slags within the composition limits given are all fluid and workable at temperatures below 1650° C. In the following table are set forth several specific examples of typical slags together with the temperature at which they attain a viscosity of 25 poises. A viscosity of 25 poises is chosen as a standard because for most furnace operations slags of this viscosity are satisfactorily workable.

| Composition—by weight | | | | 25 Poise Temperature |
|---|---|---|---|---|
| Percent $TiO_2$ | Percent CaO | Percent MgO | Percent $Al_2O_3$ | |
| 76 | 8 | 6 | 6 | 1597 |
| 71 | 10 | 7 | 8 | 1583 |
| 66 | 12 | 9 | 9 | 1570 |
| 69 | 16 | 6 | 6 | 1531 |
| 63 | 20 | 5 | 6 | 1543 |

Impurities such as silica and basic oxides may be present in the slags produced in accordance with the invention without interfering with the smelting reaction, but the total of impurities should not exceed about 5%. If excessive quantities of silica are present in the material to be treated, the silica should be reduced by operating at a temperature in the range 1600° to 1650° C., and the composition of the furnace charge should be adjusted so as to contain enough carbon for reduction of silica as well as iron oxide and to produce a slag which will permit smelting in this temperature range. In general, however, operating at temperatures above about 1650° C. ought to be avoided, for at such temperatures titanium oxide will be reduced and will not be recovered in the slag.

Although the invention is particularly useful in the treatment of titanium ore materials containing substantial proportions of either magnesium oxide or aluminum oxide or both as impurities it may be used advantageously to beneficiate titanium ores such as ilmenite, arizonite, pseudobrookite, and titaniferous iron ores and the like which are free from such oxides. It may also be used to remove iron from slags containing oxydic compounds of both titanium and iron.

Related subject matter is disclosed and claimed in my copending applications Ser. No. 591,416, filed May 1, 1945, and Ser. No. 591,417, filed May 1, 1945.

I claim:

1. The method of treating a material containing an oxydic compound of titanium and an oxydic compound of iron, which method comprises preparing a furnace charge containing said material, a quantity of a carbonaceous reducing agent sufficient to reduce substantially all of the iron oxide in said material, and a quantity of calcium oxide, aluminum oxide and magnesium oxide sufficient to flux said charge and to form, when said charge is smelted, a slag containing titanium oxide, calcium oxide, aluminum oxide, magnesium oxide, and incidental impurities, said aluminum oxide and magnesium oxide each being present in a proportion at least 5% the aggregate of aluminum oxide and magnesium oxide not exceeding 20%, calcium oxide being present in a proportion of at least 8% but not exceeding 20% of said slag, the remainder titanium oxide, the minimum titanium oxide being 62% calculated as $TiO_2$; and smelting said charge in a furnace at a temperature below 1650° C. to produce molten iron and a fluid, titanium-rich slag of such composition.

2. The method of treating a material containing an oxydic compound of titanium and an oxydic compound of iron, which method comprises preparing a furnace charge containing said material, a quantity of a carbonaceous reducing agent sufficient to reduce substantially all of the iron oxide in said material, and, for every 100 parts of titanium oxide in said material, about 9 to 32 parts of calcium oxide and 12 to 33 parts in the aggregate of aluminum oxide and magnesium oxide, the proportions of the latter two oxides being substantially equal, whereby to form, when said charge is smelted, a fluid slag containing about 8% to 20% calcium oxide, 5% to 15% aluminum oxide and 5% to 15% magnesium oxide, the aggregate of aluminum oxide and magnesium oxide being about 10% to 20%, the remainder substantially all titanium oxide, the titanium oxide content of said slag being at least 62% calculated as $TiO_2$; and smelting said charge in a furnace at a temperature below 1650° C. to produce molten iron and a fluid, titanium-rich slag of such composition.

3. A titanium concentrate comprising about 8% to 20% calcium oxide, 5% to 15% aluminum oxide and 5% to 15% magnesium oxide, the aggregate of aluminum oxide and magnesium oxide being 10% to 20%, the remainder, except for incidental impurities, being titanium oxide.

4. A titanium concentrate comprising about 8% to 20% calcium oxide, 10% to 20% in the aggregate of aluminum oxide and magnesium oxide, the remainder, except for incidental impurities, being titanium oxide, the aluminum oxide and magnesium oxide being present in substantially equal proportions and at least 5% each.

LEWIS B. WYCKOFF.

REFERENCES CITED

The following references are of record in the file of this patent:

UNITED STATES PATENTS

| Number | Name | Date |
|---|---|---|
| 486,941 | Rossi | Nov. 29, 1892 |
| 2,375,268 | Wyckoff | May 8, 1945 |

FOREIGN PATENTS

| Number | Country | Date |
|---|---|---|
| 3,582 | Great Britain | 1901 |